Aug. 11, 1942.   C. V. ROWELL   2,292,483
PROCESS AND APPARATUS FOR CONCENTRATING SOLUTIONS
Filed Aug. 31, 1939   5 Sheets-Sheet 1
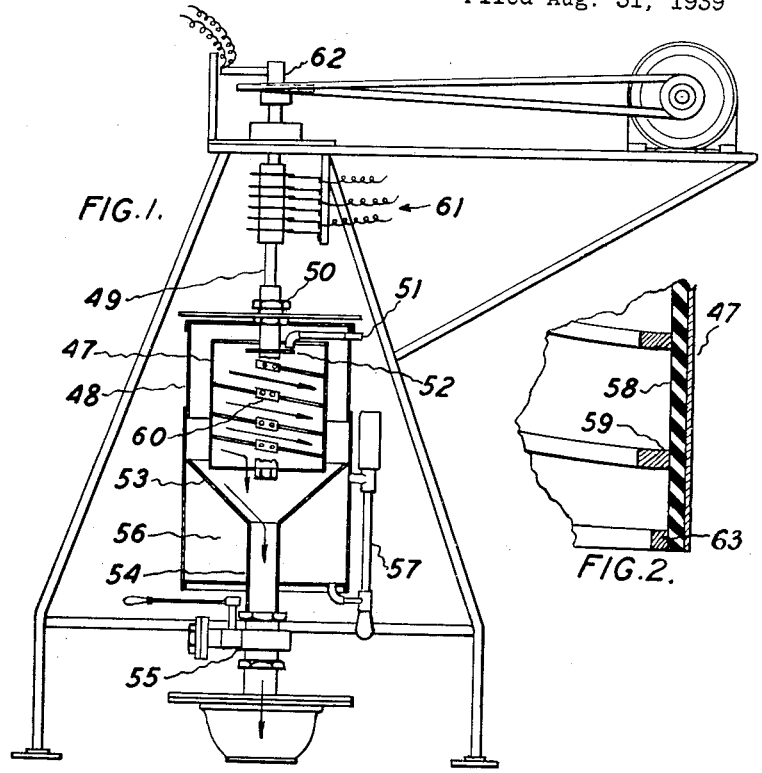
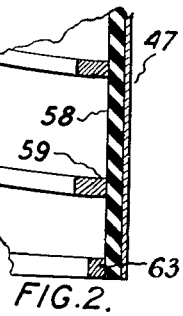
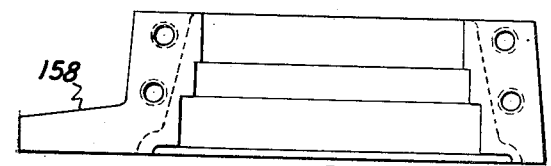
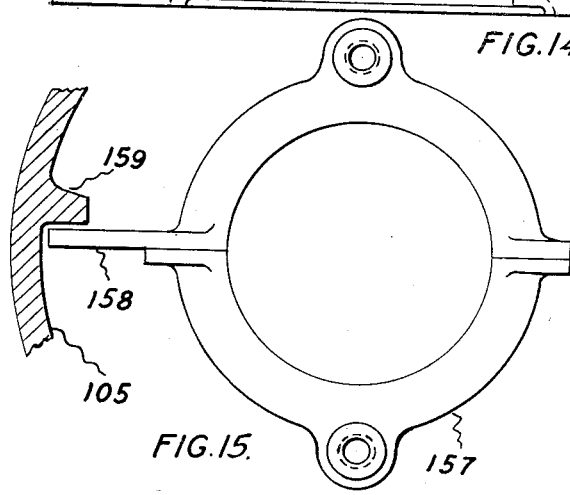

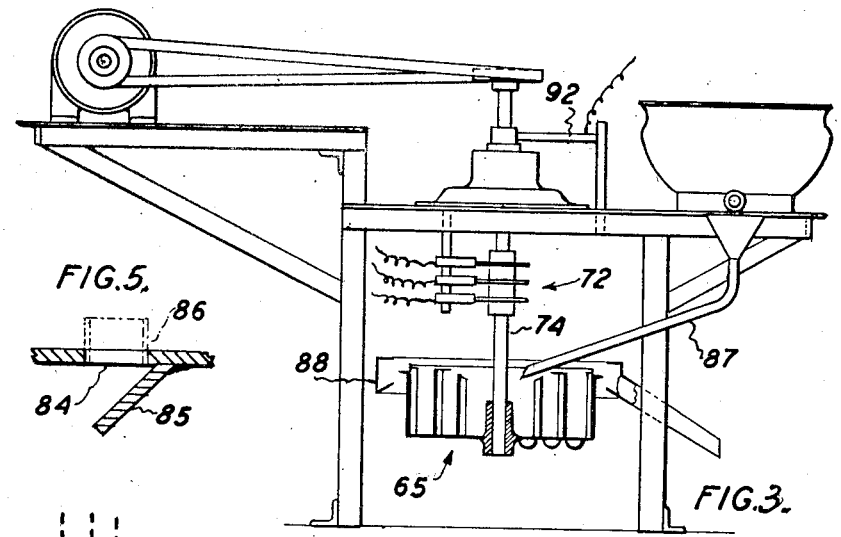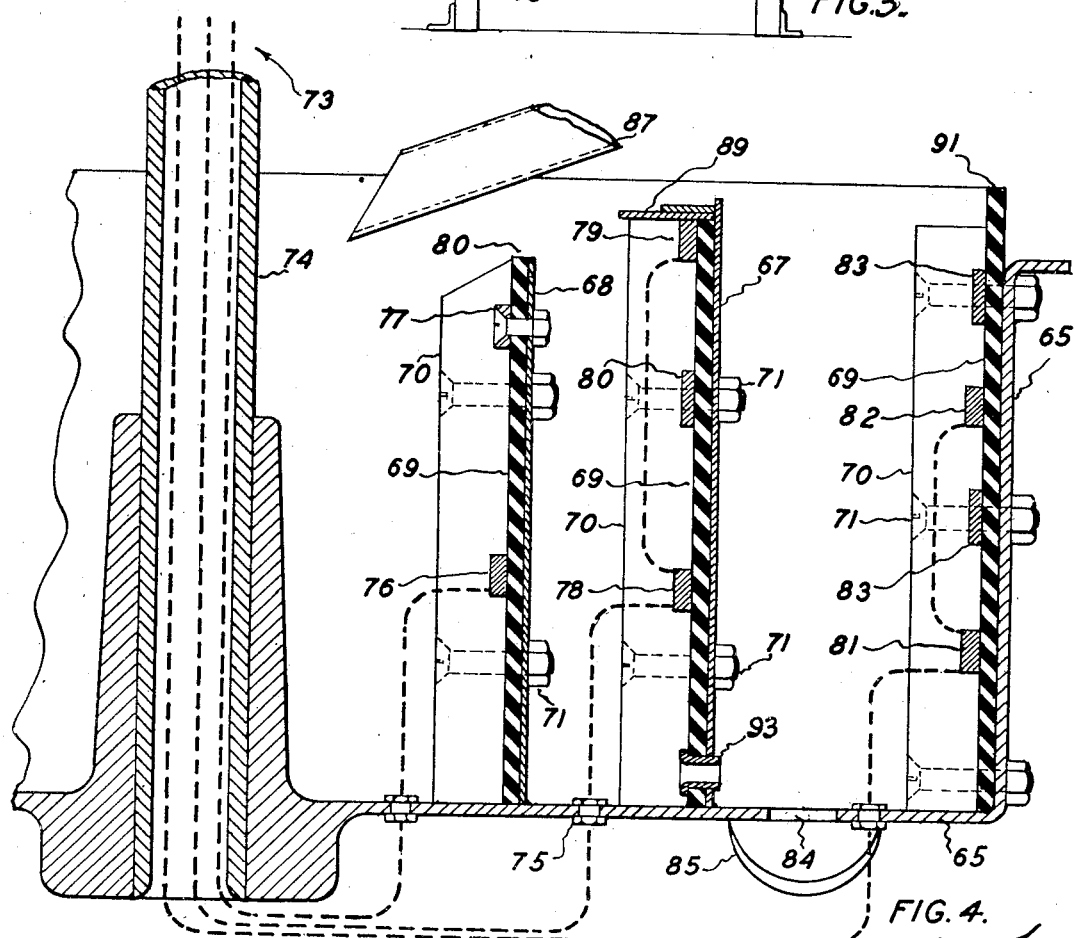

Aug. 11, 1942.   C. V. ROWELL   2,292,483
PROCESS AND APPARATUS FOR CONCENTRATING SOLUTIONS
Filed Aug. 31, 1939   5 Sheets-Sheet 3
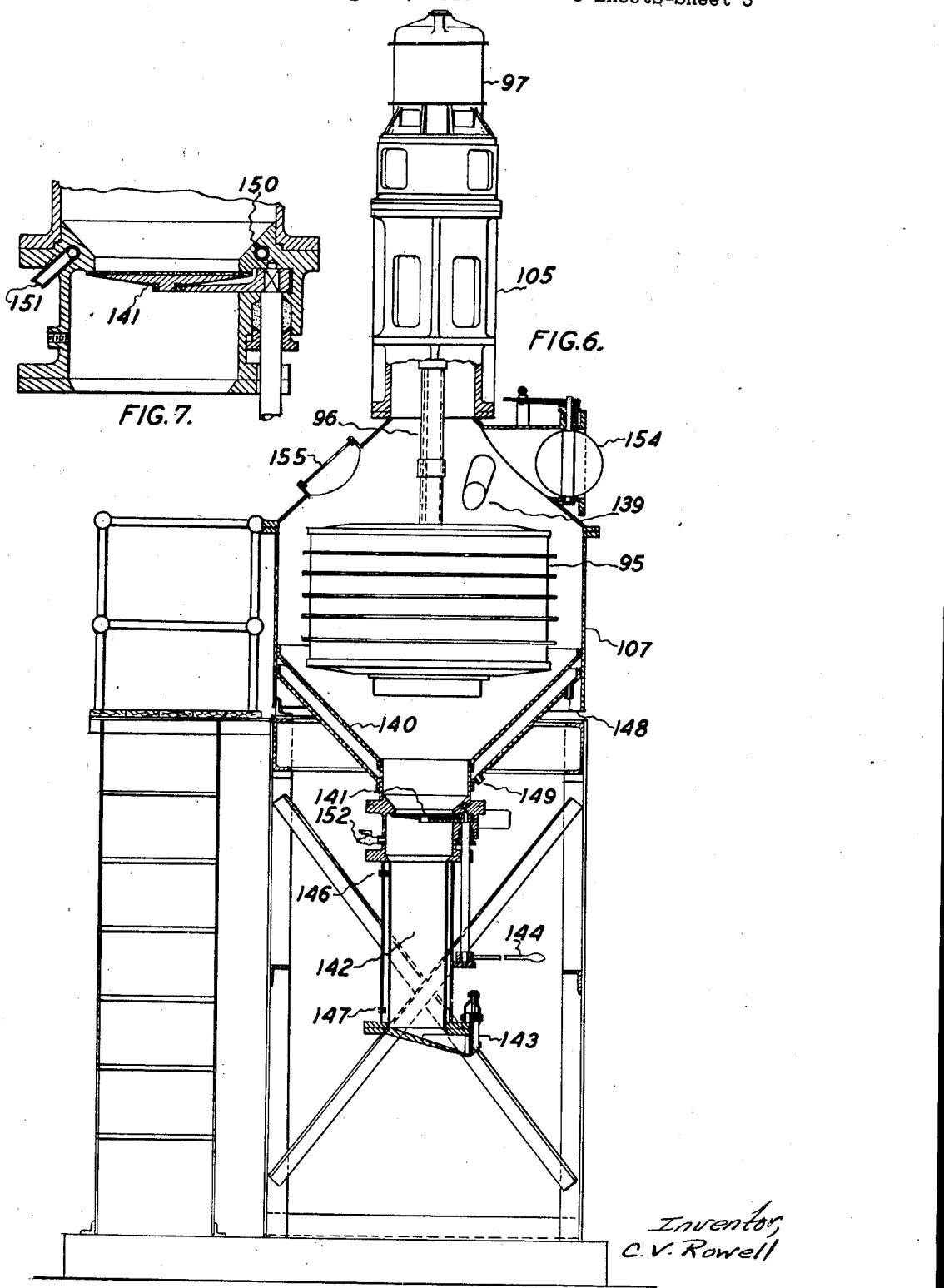
Inventor,
C. V. Rowell
by: Glascock Downing & Seebold
Attys.

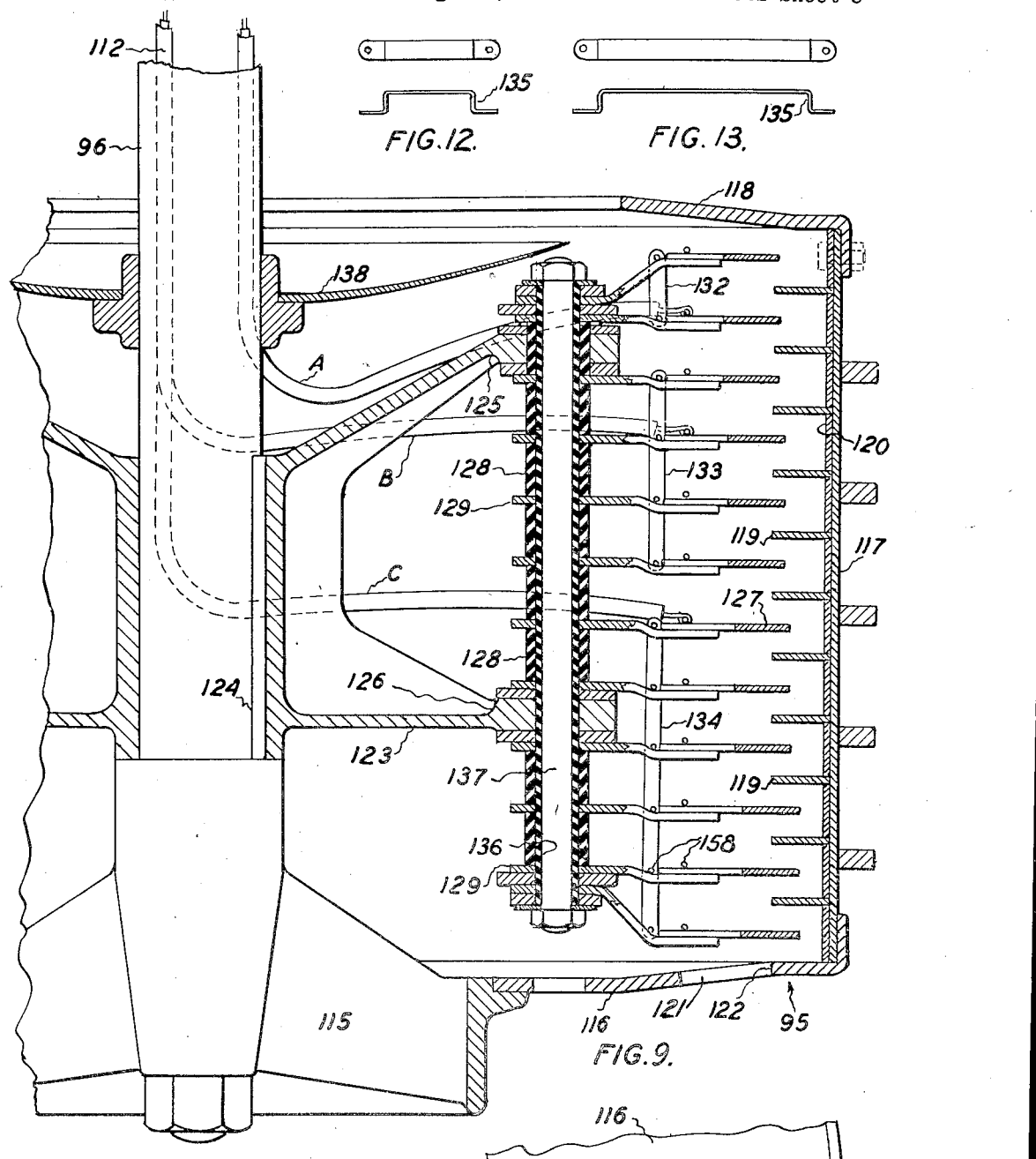

Patented Aug. 11, 1942

2,292,483

UNITED STATES PATENT OFFICE 2,292,483

PROCESS AND APPARATUS FOR CONCENTRATING SOLUTIONS

Charles Victor Rowell, Burwood, near Sydney, New South Wales, Australia

Application August 31, 1939, Serial No. 292,956
In Australia September 9, 1938

10 Claims. (Cl. 219—40)

This invention relates to a process and apparatus for concentrating solutions containing solids by vaporisation of the solvent constituent thereof, and more particularly for concentrating solutions in which the solute product is a substance of viscous or pasty or glutinous character. Thus, for instance, prominent utility of the invention is the concentration of molasses to a condition of high density at which, after subsequent cooling, it will become so far solidified that blocks of it will substantially retain their shape in normal climatic exposure for substantial periods, whereby necessity for packing in cans or barrels for transport and handling is obviated. Other notable uses are concentration of milk, concentration of sugar juice without resort to the use of a series of steps, and concentration of blood, gelatin, and other substances in which water is the solvent element.

In the concentration of most substances of the kinds above mentioned, more particularly when the solute is reduced to a highly concentrated condition, several practical difficulties are encountered. When heat is applied to a body of any such substance through the wall of the concentrating vessel or through heated surfaces over which it flows, a temperature gradient is developed, as the temperature at the heating surface must be raised to a much higher point than is necessary for vaporising the solvent, because the rate of heat transmission through the mass of material is slow and is retarded by the presence of bubbles of vapour dispersed through it which move only slowly to its exposed surface, there to escape. This lethargic release of vapour from the mass under treatment is the principal factor in prolonging the operation and necessitating the raising of the temperature at the heat transfer surfaces, with consequent risk of charring and other undesirable results.

The time required for effecting concentration of solutions which contain viscous solutes cannot be abridged in existing processes without risk of injuring the product by charring or other heat effect. Thus, for the concentration of molasses to a high density, so that when cooled it will set quite hard and may be transported otherwise than in tins, barrels, or other such liquid-tight containers, heat treatment must be carried on for several hours, even when the concentration is conducted in a high vacuum, whereas by the present invention the time required is reduced to a few minutes.

In previously known processes, excessive frothing and entrainment of liquid with the rejected vapour is in most cases an additional limiting condition on speedy concentration.

I am aware that separation and fractionation of liquids containing solids, and stratification of mixed liquids of different gravities is in some cases effected by centrifugal action. In the case of sugar concentrates, for instance, molasses is separated from sugar crystals by centrifuging, the sugar crystals being retained in a perforate basket or bowl in which the centrifuging is effected. In the case of milk and other free flowing emulsions, gravity difference between the respective constituents is augmented by centrifugal action, and the separated liquids are delivered separately out of the separator machine.

The present invention pertains to a process which is performed in a centrifuge and provides means whereby rapid release of vapour from the concentrating mass is effected, frothing is suppressed, entrainment of liquid with the discharged vapour is prevented, and temperature is substantially equalised throughout the concentrating mass and is not raised substantially above the point necessary for vaporising the solvent element.

Owing to the high pressure in the material which results from centrifugal action, vapour generated in the material under treatment during centrifuging is forced out through the exposed surface of the material immediately it is formed, and consequently conductance of heat throughout the concentrating mass is not impeded by retention of bubbles therein.

The apparatus is adapted for operation under pressure or at normal pressure or under sub-atmospheric pressure. In the case of vacuum operation, the liberated vapours are educted more rapidly, and the temperature at which vaporisation is effected is reduced so that risk of scorching or otherwise subjecting the treatment material to heat injury is minimised. Heat is preferably applied by the electric resistance method in which electrodes are immersed in the mass of treatment material, and electric current is caused to pass from one electrode to the other through the material; for this application special apparatus is provided as hereinafter described with reference to the drawings which are attached hereto.

The process features of the invention are defined below in the description of the apparatus.

In the accompanying drawings—

Fig. 1 is a view showing a concentrator suitable for continuous operation with intermittent discharge, and wherein the material under treatment is heated by employing the material itself or an ingredient thereof as an electric resistance element;

Fig. 2 is a fragmentary section of a bowl and electrode forming part of the arrangement shown in Fig. 1;

Fig. 3 is a section showing a concentrator of similar type to that shown in Fig. 1, wherein the centrifugal bowl is adapted for operation while open to the atmosphere;

Fig. 4 is an enlarged section of the bowl shown in Fig. 3, showing an arrangement of heating electrodes and conductors;

Fig. 5 is a fragmentary section showing the air inlet passages in the floor of the bowl shown in Fig. 4;

Fig. 6 is a partly sectioned elevation of an arrangement illustrating means for intermittent withdrawal of the treated material, and the jacket for the outlet passages from the bowl casing;

Fig. 7 is an enlarged sectional detail of portion of the withdrawal means shown in Fig. 6;

Fig. 9 is an enlarged sectional view of a bowl forming part of the arrangement shown in Fig. 6;

Fig. 10 is a fragmentary plan of an electrode support lug;

Fig. 11 is a fragmentary plan of the floor of the bowl shown in Fig. 9;

Figs. 12 and 13 are views of busbars used in varying the grouping of positive electrodes;

Fig. 14 is an elevation of a floating brush carrier split ring forming part of the arrangement shown in Fig. 8; and Fig. 15 is a plan projected from Fig. 14.

Figure 8:
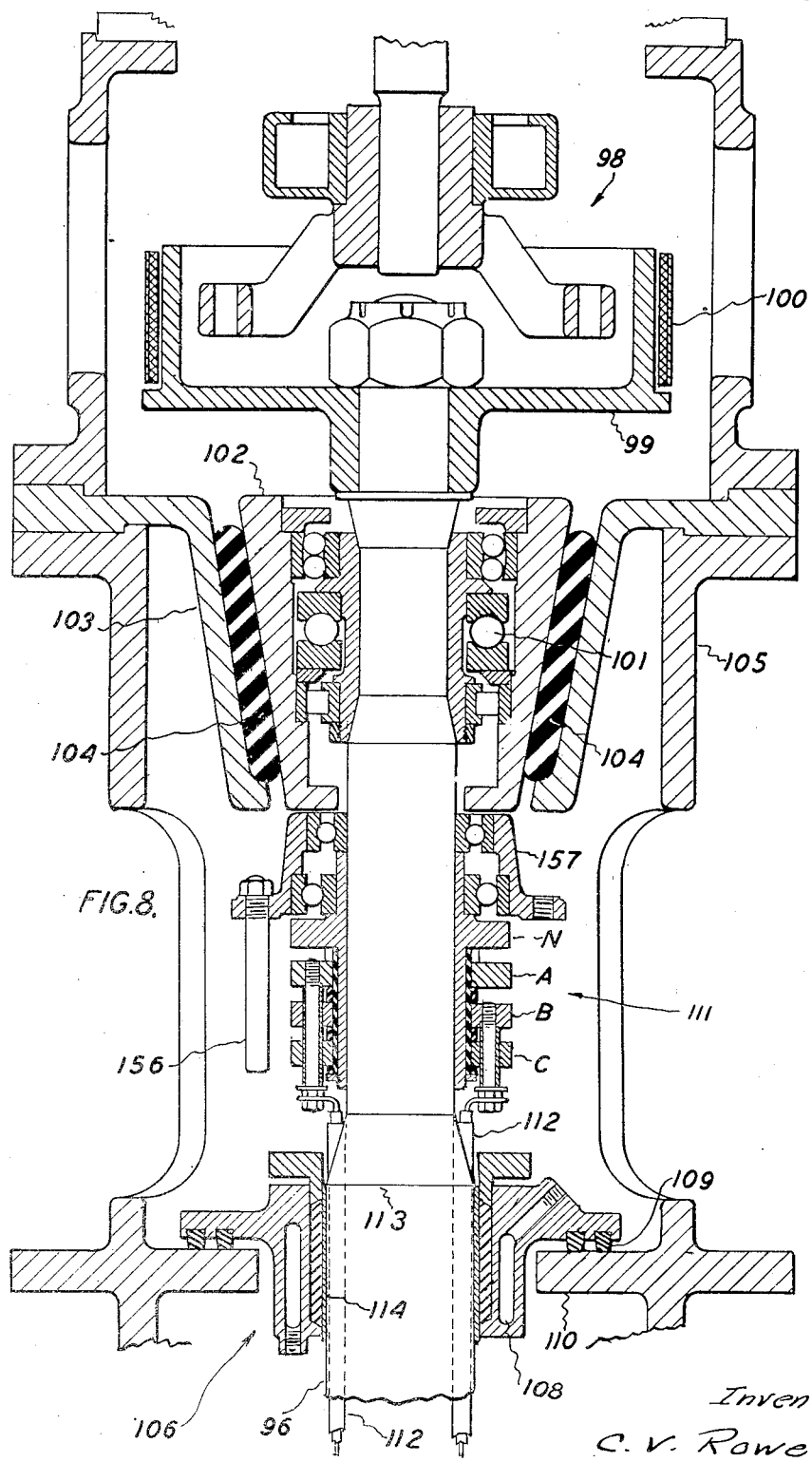
Fig. 8 is an enlarged section of the upper portion of Fig. 6.

Referring to Figs. 1 and 2, a bowl 47 is rotatably suspended within a casing 48 on a hollow spindle 49 passing through a gland 50 in the top of the casing. The casing 48 has a conical bottom 53 with an eduction pipe 54 ending in a discharge valve 55. The bottom 53 and pipe 54 are kept hot by water retained in a jacket 56, the water being heated and circulated by a heating element 57.

The bowl 47 is open ended and is lined with insulating material 58, round the inside of which electrodes 59 are placed in a helical arrangement. The current supply is polyphase, and each length of electrode includes one turn or a portion of a turn of the helix; by this arrangement the phases are in overlapping operative relation to one another. Current is supplied through brushes and slip rings at 61, and the conductors (not shown) extend down the hollow spindle 49 to the electrode terminals at 60. In operation, the material enters through the pipe 51 and is sprayed on to the walls of the bowl by the thrower 52. The material then descends the wall of the bowl as a helical strip lying between the electrodes to a radial depth determined by a weir ring 63 at the bottom of the bowl, said ring 63 being of greater internal diameter than the electrodes. The water content of the material forms a conductor between the electrodes, and the resulting heating of the material evaporates said water and other volatiles which are withdrawn from the casing 48 by any suitable means. As the helix descends, its pitch is reduced to offset the increased resistance of the material due to reduction of its water content, so to maintain equal current in the phases. The operation is across phases, a neutral being provided at 62 for safety.

Referring to Figs. 3, 4 and 5, a bowl 65 is rotatably suspended on a hollow spindle 74. Within the bowl, conductive sleeve rings 67 and 68 are concentrically fixed in metallic contact with the bottom of the bowl, and insulating material 69 is placed on the inner faces of the rings 67 and 68 and on the inner face of the wall of the bowl 65. Ring electrodes are positioned upon the insulating material, the electrodes and insulating material being fixed to their relative supporting members by insulation cleats 70 and bolts 71. Leads 73 from brushes and slip rings 72 pass down the spindle 74, and are brought up through insulators 75 in the bottom of the bowl to the electrodes. One phase lead is connected to positive electrode 76, the negative electrode 77 for which is bolted to the ring 68; a second phase lead is connected to the positive electrodes 78 and 79 for which the negative electrode 80 is connected to the ring 67 by the bolts 71, and a third phase lead is connected to the positive electrodes 81 and 82 for which the negative electrodes 83 are connected by bolts to the wall of the bowl 65. Air may be induced upwardly into the bowl through holes 84 in the bottom, by means of scoop blades 85 attached to the bottom of the bowl. Short ferrules 86 may be used in the holes 84 to prevent spillage.

In operation, material is supplied through a pipe 87 and falling to the bottom of the bowl 65 near the centre thereof is thrown outwardly, mounting the first wall and bridging the electrodes 76 and 77; thence flowing over the top 89 it is thrown outwardly under a collar 89 of insulating material on to the positive electrode 79. It then flows downwardly over the negative electrode 80 and the positive electrode 78 and thence to the nipples 93, through which it is projected to the outside wall. The material then mounts the outside wall, passing alternately over the positive electrodes 81 and 82 and the negative electrodes 83, and is finally discharged over the rim 91 into the circular trough 98.

During its progress through the bowl, the material is subjected to increasing centrifugal pressures, and as water is progressively evaporated from it by the heating, the positive and negative electrodes are placed at decreased distances apart in order to balance the phases. The bowl 65 is the neutral, the lead for which is connected at 92. The air passing upwardly through the holes 84 is desirable in some cases, such as for the concentration of milk or tannic acid, where it is necessary to limit the temperature rise. The leads and connecting links are not submerged during the operation, as the electrodes are only thinly covered by the material, the depth of the film being about one thirty-second of an inch.

In the arrangement shown in Figs. 6 to 15, the rotatable bowl 95 is suspended on a spindle 96 which is driven by a motor 97 through a flexible coupling 98 of a known type. A band brake 100 is applied to the driven member 99 of the coupling to facilitate stopping the bowl. The weight of the bowl 95 is carried on a ball thrust bearing 101 arranged within an inverted cone-shaped housing 102. The housing is supported by a seating 103 mounted on the frame 105. Between the housing 102 and seating 103, a buffer 104 of resilient material is interposed to provide against possible gyration of the bowl during operation. The spindle 96 extends downwardly, passing through a gland 106 into a sealed casing 107 surrounding the bowl 95. The gland 106 is water jacketed at 108 and is flexibly carried by resilient joint rings 109 upon a flange 110 in the framing 105. An assembly 111 of slip rings with brushes and brush carriers is placed on the spindle 96, and comprises rings A, B, C and a neutral N. Brushes (not shown) are carried on bars 156 supported on the rotatable rocker 157. The rocker is split diametrically and carries a projection 158 which engages with a lug 159 on the inner face of the frame 105. As the spindle 96 turns only in one direction, the rocker is prevented from rotating with it but is free to move in response to vibrations of the bowl 95. Insulated conductors 112 are carried downwardly from the phase rings in grooves cut in the spindle 96. The spindle is increased in diameter at 113 to provide depth for the conductor grooves, and is encased in a sheathing 114 where it passes through the gland 106 into the casing 107.

The bowl 95 is attached to the spindle 96 by a spider 115, and consists of a bottom plate 116, a banded cylinder 117, a cover plate 118, and a number of similar annular negative electrodes 119 within the cylinder 117 and in contact with it. The electrodes are positioned apart by bands 120 of equal height. Apertures 121 are cut in the bottom plate 116 of the bowl as outlets for the treated material, the outer edges 122 of the apertures being in vertical alignment with the inner edges of the negative electrodes 119.

The positive electrodes 127 are supported by a spider 123 keyed at 124 to the spindle 96, the spider arms terminating in upper and lower eyes 125 and 126, which are bored in line for a bolt 137 which is insulated by a sleeve 136. Upon the bolt 137 a number of support lugs 129 for the positive electrodes 127 are assembled, being spaced apart by insulating thimbles 128. The positive electrodes 127 are flat and of split ring form, and are bolted to the lugs 129 as shown at 130. At or near these junctions are welded studs 158, which are used for connection of the conductors 112, and of the busbars 132, 133, and 134 which are used for the purpose of grouping the electrodes. As shown in Fig. 9, the positive electrodes 127 are spaced midway between the negative electrodes 119 (the top and bottom plates 118 and 116 of the bowl being negative) to provide equal distances between electrodes throughout. In order to ensure equal current distribution between phases by way of counteraction to the increased resistance in the material under treatment due to the progressive reduction in water content, the amount of overlap between the positive and negative electrodes increases in downward progression. With the same object in view, the positive electrodes are grouped to the several phases in the following manner: the top two electrodes are connected by busbar 132 and are supplied through phase A; the next lower four positive electrodes are paralleled by busbar 133 and are connected to phase B, and the next six positive electrodes are paralleled by busbar 134 and are connected to phase C. These arrangements may be varied in any manner to produce the desired effect, for which purpose busbars as shown in Figs. 12 and 13 may be used. These bars are offset at 135 to permit of connecting an electrode to one spaced from it without contacting with an intermediate electrode.

Material for treatment is introduced into the bowl 95 through a pipe 139 and falls onto a spreader 138 which is attached to the spindle 96 and is adapted to project the incoming material into the uppermost pocket between the electrodes. The material then flows downwardly over the negative electrodes filling the spaces therebetween, and submerging the edges of the positive electrodes by the distance they extend into these spaces. Current passes from the positive to the negative electrodes, heating the material in its passage, water and lighter fractions being vaporised thereby in small bubbles. These bubbles pass rapidly inwardly to the surface of the material and are there liberated to the atmosphere within the casing 107. The treated material is thrown out through the apertures 121 against the conical bottom 140 of the casing 107; it then passes through an intermediate valve 141 which is operatable by a handle 144, into a discharge chamber 142 and is thence discharged through a valve 143.

With materials like molasses, which must be heated to remain fluid, the conical bottom 140 of the casing 107 is jacketed and kept hot, as by steam passing through pipes 148 and 149. The discharge chamber 142 is also jacketed and supplied with heat through pipes 146 and 147.

When the treatment proceeds under vacuum induced through a valve 154, the intermediate valve 141 is opened until the discharge chamber 142 is filled. It is then closed and the discharge valve 143 is opened, air being admitted to the chamber 142 through a valve 152 to release the material when the valve 143 is opened. The casing 107 is provided with a window 155 for observation.

I claim:

1. Apparatus for the purposes set forth comprising a cylindrical bowl with an inwardly disposed flange on its top end and vents in the bottom of it, a tier of horizontal flat electrode rings disposed around the interior face of its side wall in electrical communication with each other, a hollow bowl-suspending spindle provided with means for rotating it, brackets fixed on said spindle, a plurality of vertical studs supported on said brackets within the bowl, a tier of electrode rings mounted on but insulated from said studs and positioned to project into the spaces intermediate the bowl wall ring electrodes, electric return and supply leads brought down through said spindle and connected respectively to said wall electrode rings and to said bracket-carried electrode rings, a thrower disc fixed on the spindle immediately under the top of the bowl and above the electrode ring assembly, and means for continuously supplying liquid into said disc whereby it will be thrown towards the bowl wall and caused to flow downward in a zig-zag course traversing between the electrode rings while the bowl is in rotation, and will suffer resistance heating by electric current flowing between the opposed electrodes during its descent along the bowl wall to discharge radially through the vents in the bowl bottom.

2. The apparatus defined in claim 1 arranged for operation on tri-phase electric supply and characterised in that the bowl wall electrodes are all connected to the neutral line and the three-phase lines are respectively connected to the bracket-carried electrodes in groups of two, four, and six, thereby to increase the current transmission through and the resistance heating effect on the liquid under treatment in correspondence with progressive increase in its specific resistance as its density increases consequent on concentration.

3. Apparatus according to claim 1, in which the bracket-carried electrodes are respectively non-contactingly interleaved between the bowl-wall electrodes, the interleaved area of the successive electrodes in each tier progressively increasing towards one end of the said tiers.

4. In combination with apparatus defined in claim 1, a vacuum chamber enclosing the bowl and the upper part of the bowl spindle, and a lock chamber in the lower end of said enclosing chamber, a feed pipe extending through the chamber wall above the bowl, a pipe connecting the chamber with a vacuum pump, a regulating valve in said pipe, a sight window in the chamber wall above the bowl, a slide gate on the head of the lock chamber, and a foot gate at the bottom of the lock chamber.

5. Centrifugal apparatus for the purposes set forth comprising, an open top vertical cylindrical bowl suspended by a hollow spindle for rotation, a plurality of vertical diaphragms fixed in the bowl and arranged to divide it into concentric annular compartments of differential height, electrically insulating liners covering the concave surfaces of the bowl wall and said diaphragms, electrode rings spaced apart and mounted on each of said liners, electric supply insulated lines connected to said electrode rings, said compartments being in communication with each other alternately below and above the respective diaphragms so as to direct the liquid upwardly and downwardly through them alternately while contacting with said rings, and means for continuously supplying a liquid into the central compartment, the electric supply connections being so arranged that the current paths are through the liquid which is flowing hrough the compartments successively, and said rings being spaced so that resistance heating is maintained approximately uniform throughout the flowing liquid.

6. Apparatus according to claim 5, having the electric supply lines connected to three phase electric supply mains through brushes contacting with insulated electrode collector rings fixed on the upper part of the bowl spindle and having the electrode rings so spaced and the line connections thereto so arranged that the current paths through the walls of liquid in which the electrodes are immersed are shorter in the outer annular compartment than in the inner compartments of the bowl.

7. The process of concentrating a liquid solution by extracting vaporizable substances therefrom which consists in, establishing a hollow rotating liquid body of annular cross-sectional shape by centrifugal force, and passing electric current through said liquid body by means of electrodes immersed therein thereby internally heating said liquid to cause vaporization.

8. The process of concentrating a liquid solution by extracting vaporizable substances therefrom which consists in, establishing a hollow rotating liquid body of annular cross-sectional shape by centrifugal force, continuously adding liquid to one end of said liquid body so that said liquid body constitutes a part of a continuously moving stream of said liquid, and passing electric current through said liquid body by means of electrodes immersed therein thereby internally heating said liquid body to cause vaporization.

9. The process of concentrating a liquid solution by extracting vaporizable substances therefrom which consists in, centrifugally establishing a hollow liquid body within a rotating bowl, maintaining the hollow interior of said liquid body under partial vacuum, and passing current through said liquid body by means of electrodes immersed therein thereby internally heating said liquid body to cause vaporization.

10. The process of concentrating a liquid solution by extracting vaporizable substances therefrom which consists in, centrifugally establishing a hollow liquid body within an open ended rotating bowl, continuously adding liquid to one end of said liquid body, maintaining the hollow interior of said liquid body under partial vacuum, and passing current through said liquid body by means of electrodes immersed therein thereby internally heating said liquid body to cause vaporization.

CHARLES VICTOR ROWELL.